May 17, 1966  R. H. HANSEN  3,251,911
PREPARATION OF EXPANDED POLYMERS
Filed April 16, 1963
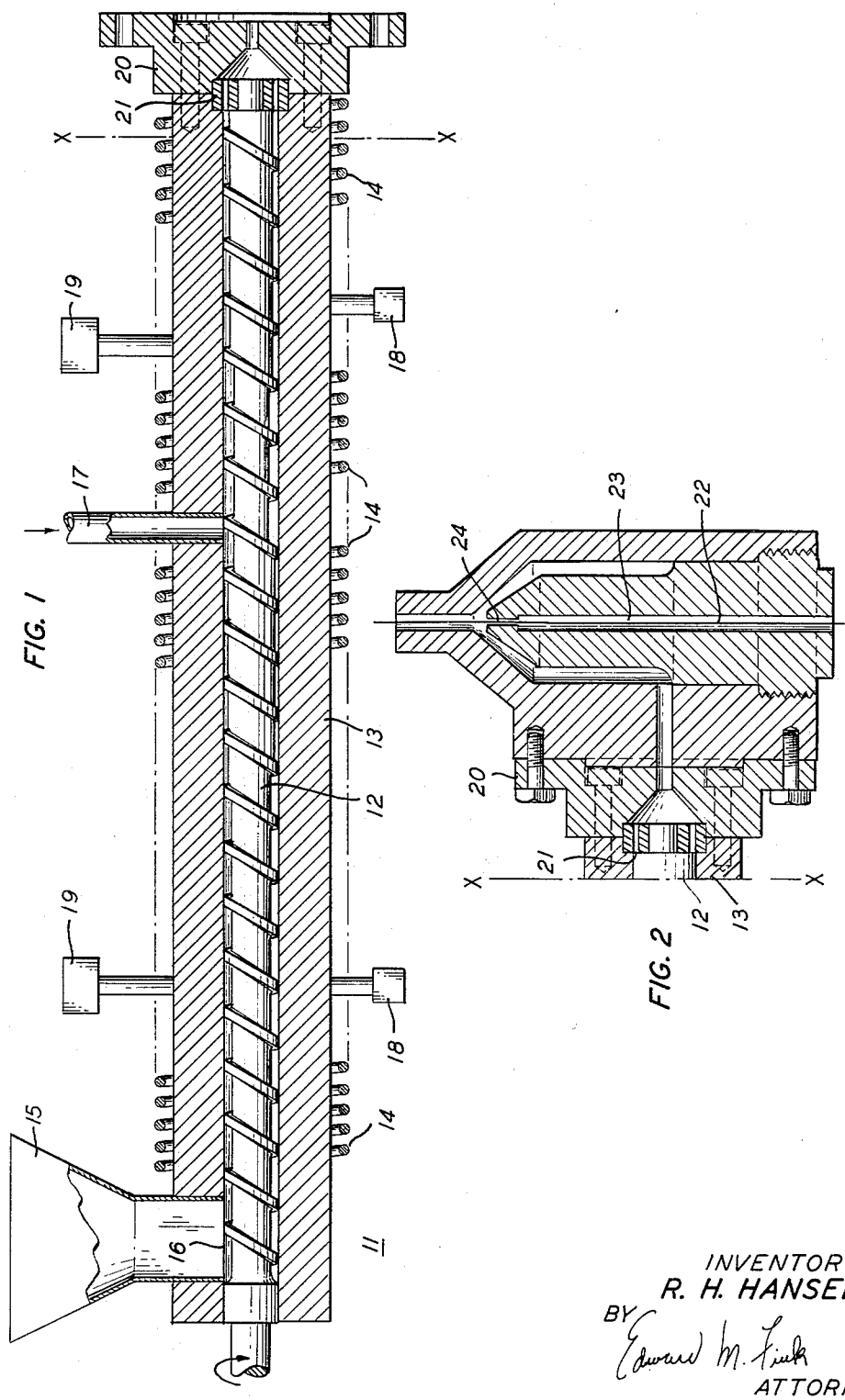
INVENTOR
R. H. HANSEN
BY
Edward M. Fink
ATTORNEY United States Patent Office 3,251,911
Patented May 17, 1966

3,251,911
PREPARATION OF EXPANDED POLYMERS
Ralph H. Hansen, Short Hills, N.J., assignor to Bell Telephone Laboratories, Incorporated, New York, N.Y., a corporation of New York
Filed Apr. 16, 1963, Ser. No. 273,328
12 Claims. (Cl. 264—25)

The present invention relates to a process for the preparation of expanded polymers and to the polymeric compositions so produced. More particularly, the present invention relates to a technique for preparing cellular polymeric bodies having a uniform distribution of fine cells, such bodies being of particular interest for use in electrical insulating applications.

Heretofore, two general techniques have been available in preparing expanded polymeric compositions. The earlier of these methods, direct gas injection, involves impregnating a molten polymer with a gas soluble therein, under pressure, then releasing the pressure while maintaining the temperature constant, so resulting in expansion of the polymeric composition.

The more recent and most commonly used method involves incorporating in the material to be expanded a chemical blowing agent which, under the influence of heat evolves gas, so causing the formation of numerous cells.

Although the noted prior art techniques have been satisfactory in most uses, workers in the art have sought an alternative technique for preparing expanded polymeric composition wherein a uniform distribution of fine cells was readily attainable.

In accordance with the present invention, such an alternative technique is described. The inventive process involves introducing a dispersion of nucleation or heat centers into a molten thermoplastic material having a gas dissolved therein, under pressure, and extruding the resultant mixture into a zone of lower pressure wherein nucleation of the dissolved gas occurs, so resulting in the formation of an expanded thermoplastic material.

The nucleation or heat centers described herein are insoluble in the thermoplastic material and of two general types. In the preferred embodiment, the heat centers result from chemical reagents which decompose exothermally upon the application of heat, so elevating the temperature of the thermoplastic material locally. In the use of such reagents, hereinafter termed "exothermic chemical reagents," it is a requirement that heat be evolved as gas goes out of solution in the thermoplastic material, i.e., the rate of decomposition of the exothermic reagent must be such as to assure the evolution of heat as the body of thermoplastic material emerges from the extruder.

The second type of heat center results from the selective increase in temperature of discrete particulate matter, insoluble in the thermoplastic material, as it emerges from the extruder. The prime example of this second type of heat center is black body absorption of radiation, as from a light bulb.

For simplicity, much of the description is in terms of exothermal chemical reagents which, when heated, decompose with the concomitant evolution of heat. It will be understood by those skilled in the art that in the case of black body absorption of radiation the discrete particulate matter remains in a second phase in the extruder and does not undergo any exothermal decomposition.

In a specific embodiment the present invention is directed to a technique for extruding compositions of the type described about a wire conductor.

The invention will be more readily understood from the following detailed description read in conjunction with the accompanying drawing wherein:

FIG. 1 is a cross-sectional view of an extruder suitable for the practice of the present invention; and FIG. 2 is a cross-sectional view of a typical wire covering crosshead die used in extruding expanded polymers about a wire conductor.

With reference now more particularly to FIG. 1, there is shown an extruder 11 having a forwarding screw 12 rotatably mounted in barrel 13 heated by means of electrical resistance heaters 14. The barrel of the extruder is fitted with a tangentially situated feed hopper 15 having feed port 16 situated at the base thereof, inlet 17 for the introduction of gas therethrough, thermocouples 18, pressure gauges 19 and die 20. The die of the extruder is fitted with a breaker plate 21 which is placed between the end of screw 21 and die 20 in order to assist in the build-up of a pressure gradient along the length of the screw. The screw of the extruder may be driven by any suitable means, for example, an electric motor, not shown.

In the operation of the process for preparing cellular polymeric compositions, the polymer admixed with discrete particulate matter comprising an exothermic chemical reagent, having decomposition characteristics compatible with the polymer, is fed into the extruder through hopper 15 and feed port 16. Screw 12 driven by suitable means takes the mixture of polymer and particulate matter from the feed port through barrel 13 which is heated by means of electrical resistance heaters 14. During this period, the mixture is forced into intimate and substantially sliding contact with the hot barrel walls and is also sheared and worked whereby frictional effects are produced. The combined effects of the heated barrel and the heat due to internal friction in the material cause the thermoplastic mass to be molten by the time it has travelled approximately one-fourth of the distance of the extruder barrel, so assuring that it may be forced through the restriction to the extrusion die where it is given the desired form.

The molten mixture proceeds through barrel 13 (without appreciable decomposition of the particulate matter) and enters a low pressure area in the neighborhood of gas inlet 17, at which point a selected gas, under pressure, is admitted to the system. It will be appreciated that the low pressure alluded to is not a requirement of the present inventive technique but is merely a convenient means for the introduction of a gas. As the molten mixture continues along its path through barrel 13 toward breaker plate 21, the gas so admitted enters solution. The molten solution of gas in thermoplastic material containing the dispersion of exothermic chemical reagent next passes from a high pressure area to a low pressure area as it emerges from the die. Nucleation or seeding of the now supersaturated solution of gas in polymer is attained by the continued decomposition of the particulate matter in the die and extrudate with the concomitant formation of "hot spots" or thermal gradients which cause the initiation of bubbles in the solution of gas in polymer extrudate, so resulting in the desired cellular structure.

As noted previously, it is highly desirable that a uniform distribution of fine cells be attained in order to achieve the desired level of efficiency. Ultimate cell size depends primarily on the ratio between the amount of dissolved gas and the number of nucleated bubbles in addition to the competition for dissolved gas between the internal surface created by the nucleated bubbles and the external surface of the object being expanded. In the described situation, many bubbles are initiated by the continued decomposition of a sufficient concentration of particles of the particulate matter in the extrudate and the ratio of the total internal surface area to the external surface area is greater and thus more favorable for retention and utilization of the dissolved gas. The existence of such a favorable surface area results in greater efficiency since a proportionally greater amount of gas separates from the liquid phase by diffusing to the bubble surfaces and thus the amount of gas lost by diffusion to the external surface is smaller. Thus it becomes apparent that fine cell structure and high efficiency of expansion are obtained when decomposition of the particulate matter having the proper time-temperature dependency and rate of decomposition approaches but does not attain completion within the extruder.

The exothermic chemical reagents employed in the practice of the invention are insoluble in the polymer and manifest decomposition characteristics which are compatible with both polymer and process equipment, thereby assuring continued decomposition at a suitable rate in the extrudate. It has been determined that reagents suitable in this use evolve between 100 to 500 calories of heat per gram of matter upon decomposition. However, it will be appreciated that the noted limits are not absolute and variations may be made in selected cases. Typical reagents employed are azodicarbonamide, N-aminophthalimide, 4,4'-oxybis (benzenesulphonylhydrazide), N,N'-dinitrosopentamethylenetetramine, et cetera.

The second type of chemical reagent employed is a distinct case in which discrete particulate matter interacts with externally applied energy upon exit from the extruder, so resulting in the noted hot-spots or thermal gradients. Thus, coarse carbon black particles or agglomerates irradiated by a source of radiation having a wavelength of frequencies within the range of 3300 Angstroms to 3 microns is found suitable for this purpose.

Although the particle size of the particulate material is not considered critical, a general preference exists for very fine particles. It has been found that material finer than 325 mesh containing particles ranging from an average of less than 0.5 micron to an average of more than 20 microns produces satisfactory results.

The exothermic chemical reagent is generally employed in an amount within the range of 0.001 to 0.5 percent based on the weight of the polymer, a preferred range being 0.01 to 0.1 percent. The use of amounts less than the noted minimum fails to produce the desired degree of nucleation whereas the use of amounts appreciably beyond the noted maximum tend to impair dielectric properties and increase the amount of residue without improving cell structure.

It will be recognized that some of the exothermic chemical reagents described herein are blowing agents which are commonly employed in conventional expansion methods; however, in such applications they are employed in appreciably greater quantities. It has been found that expansion obtained in accordance with the present invention is at least twice as great as that obtained in such prior art techniques.

The polymer suitable for use in the present invention may be any normally solid polymer or mixture of polymers obtained by polymerizing or copolymerizing aliphatic olefins such as ethylene, propylene, or mixtures thereof, et cetera, or halogenated aliphatic olefins such as vinyl chloride, et cetera.

The gas which is employed in the practice of the invention must be soluble in the polymer being expanded at the conditions of temperature and pressure within the process equipment and must be able to diffuse to bubble surfaces at a rate which is compatible with the generation of bubbles by nucleation all gases meeting these conditions. Suitable gases in this use are argon, nitrogen, helium, compressed air, carbon dioxide, et cetera. The gas so employed is admitted under a pressure within the range of 500 to 2500 p.s.i. under conditions such that the molten thermoplastic material is essentially saturated.

A general outline of the methods herein described and the ranges of operating parameters will now be given.

In the practice of the invention, a dispersion of the exothermic chemical reagent in polymer is obtained by charging the ingredients to a suitable mixing device such as a paint mixer, et cetera, and thoroughly admixing for several minutes. After a thorough dispersion or admixture is obtained, the composition is fed directly to the feed hopper of an extruder of the type shown in FIG. 1.

The composition is next charged to the barrel of the extruder, which has been preheated to a temperature slightly above the softening point of the polymer, typically from 100° C. to 150° C. for a polyolefin such as polyethylene, wherein it is thoroughly worked and fed therealong by means of the screw. Temperatures and residence time must be selected so that excessive decomposition of the exothermic chemical reagent does not occur for this may result in loss of control and unsatisfactory cell structure.

After traveling approximately one-fourth of the distance of barrel 13, the mixture becomes molten. The molten mixture then continues through the barrel and as it approaches vent 17, a suitable gas soluble in the polymer is admitted, under pressure. The mixture then proceeds toward the breaker plate which restricts its flow and creates a back pressure typically within the range of 1000–6000 p.s.i., so preventing the injected gas from expanding.

As the composition passes through the breaker plate, it is led to a forming section comprising a die, and, subsequently, passes through an orifice into an area of reduced pressure, usually the atmosphere, wherein dissolution of the dissolved gas and expansion of the polymer occurs. The bulk of the exothermic chemical reagent, used to initiate bubble formation, is caused to decompose by the temperatures employed in the head and die of the extruder, such being of the order of 10° C. to 50° C. higher than those in the barrel. It will be understood by those skilled in the art that extrusion temperatures may vary, depending upon the rate of extrusion, since decomposition temperatures of the exothermic chemical reagent are both time and temperature dependent.

In certain applications it is convenient to arrange the die body and die of the extruder in such manner that the extrudate leaves the extruder and is taken off in a direction perpendicular to the axis of the screw. This type of die is known as a crosshead and is used in processes in which it is desired to introduce a continuous filament to the die, as in the case of a wire conductor.

FIG. 2 is a cross-sectional view of a typical wire covering crosshead employed in such applications. There is shown in the figure breaker plate assembly 21, wire 22 and wire guide 23 and wire guide mandrel 24. In this type of apparatus, the molten thermoplastic material is forced through the breaker plate assembly and is conducted to the wire guide mandrel or point 24 which is shaped so that the composition flows around either side of it and joins again on the side remote from the supply. The complete annulus of material then flows toward the die orifice and ultimately contacts the wire. In this manner, a tube of plastic material is deposited over the wire which moves continuously through the crosshead and acts as an internal forming mandrel.

The following examples will more fully illustrate the described technique.

*Example I*

(a) 1000 grams of polyethylene granules having a density of 0.92 g./cm.$^3$ at 23° C. and a melt index of 190° C. of 0.2 to 0.4 and 1 gram of azodicarbonamide having an average particle size of about 1 micron were inserted into a paint mixer and thoroughly admixed. The resultant mixture was then charged to the hopper of a screw extruder of the type shown in FIG. 1, the barrel of the extruder having been preheated to a temperature ranging from about 130° C. near the hopper to 160° C. near the gas inlet port to about 200° C. near the breaker plate with nitrogen flowing therethrough under a pressure of 1000 p.s.i. A breaker plate positioned at the discharge end of the barrel of the extruder was employed to restrict the flow of the molten solution of nitrogen in polyethylene, so creating a back pressure of approximately 3300 p.s.i. Thereafter, the molten polyethylene passed through the head and die of the extruder and through an orifice into the atmosphere, its temperature being 209° C., wherein it expanded to form a cellular mass. The resultant expanded polyethylene evidenced a uniform distribution of fine cells having an average diameter within the range of 0.5 to 1.0 mil, expansion being 36.4 ±2 percent of the originally charged polyethylene.

(b) For purposes of comparison, the procedure of Example I (a) was repeated in the absence of added nitrogen. The resultant composition did not contain any perceptible cells and expansion was approximately 2.4 ±2 percent.

*Example II*

The procedure described in Example I(a) was repeated with the exception that a wire covering crosshead die of the type shown in FIG. 2 was employed, a 19 gauge copper conductor, a 37.5 mils diameter, being passed therethrough at a speed of 62 feet per minute. As the conductor emerged from the die it had a continuous smooth skin of polyethylene having a uniform distribution of fine cells, expansion being 36.4 ±2 percent.

*Example III*

The procedure described in Example I(a) was repeated with the exception that 0.2 gram of azodicarbonamide was employed. The resultant polyethylene evidenced a uniform distribution of fine cells having an average bubble size within the range of 0.7 to 2.0 mils, expansion being 36.7 ±2 percent.

*Example IV*

(a) The procedure as described in Example III was repeated with the exception that argon was substituted for the nitrogen. The resultant expanded polyethylene evidenced a uniform distribution of fine cells having an average diameter of 0.8 to 2.5 mils, expansion being 33.9 ±2 percent.

(b) The procedure described in Example III was repeated with the exception that helium was substituted for the nitrogen. The resultant expanded polyethylene evidenced a uniform distribution of fine cells having an average diameter within the range of 1 to 2 mils, expansion being 34.9 ±2 percent.

(c) The procedure described in Examples IV(a) and IV(b) was repeated with the exception that azodicarbonamide was not employed. In each case the resultant compositions were rough and blistered and evidenced very few large cells, expansion being 3.2 ±2 and 9.3 ±2 percent, respectively.

*Example V*

The procedure of Example IV(a) and IV(b) was repeated utilizing a wire covering crosshead die of the type shown in FIG. 2, a 19 gauge copper conductor of 37.5 mils diameter being drawn therethrough at a speed of 62 feet per minute. In each case, the conductor emerged from the die bearing a smooth and continuous uniform skin of expanded polyethylene having the characteristics noted in Examples IC(a) and IV(b).

*Example VI*

(a) 1000 grams of polyethylene having a density of 0.92 g./cm.$^3$ and 4 grams of N-aminophthalimide were inserted into a paint mixer, and thoroughly admixed. The resultant mixture was then charged to the hopper of a screw extruder of the type shown in FIG. 1, the extruder having been preheated to temperatures ranging from 155° C. to 200° C. in the barrel to about 210° C. in the head with argon flowing therethrough under a pressure of 1580 p.s.i. A breaker plate plate positioned at the discharge end of the barrel of the extruder was employed to restrict the flow of the molten solution of argon in polyethylene, so creating a back-pressure of approximately 2700 p.s.i. Thereafter, the molten polyethylene passed through the head and die of the extruder and through an orifice into the atmosphere wherein it expanded to form a cellular mass. The resultant expanded polyethylene evidenced a uniform distribution of fine cells.

(b) The procedure of Example VI(a) was repeated with the exception that the N-aminophthalimide was not employed. The resultant composition was rough and contained few cells, such being large in nature.

(c) The procedure of Example VI(a) was repeated with the exception that argon was not employed. The resultant composition did not contain any cells.

(d) The procedure of Example VI(a) was repeated with the exception that a wire covering crosshead die of the type shown in FIG. 2 was employed, a 19 gauge copper conductor of 37.5 mils diameter being drawn therethrough at a speed of 53 feet per minute. The conductor emerged from the die bearing a smooth and continuous skin of expanded polyethylene having the characteristics noted in Example VI(a).

*Example VII*

(a) 100 grams of polyethylene having a density of 0.92 g./cm.$^3$ and 5 grams of 4,4'-oxybis (benzenesulfonylhydrazide) were inserted into a paint mixer and thoroughly admixed. The resultant mixture was then charged to the hopper of a screw extruder of the type shown in FIG. 1, the extruder having been preheated to temperatures ranging from 105° to 155° C. in the barrel and about 175° C. in the head (stock temperature 175°) with argon flowing therethrough under a pressure of 2000 p.s.i. A breaker plate positioned at the discharge end of the barrel of the extruder was employed to restrict the flow of the molten solution of argon in polyethylene, so creating a back pressure of approximately 2250 p.s.i. Thereafter, the molten polyethylene passed through the head and die of the extruder and through an orifice into the atmosphere where it expanded to form a cellular mass. The resultant expanded polyethylene evidenced a uniform distribution of fine cells having an average diameter within the range of 2 to 3 mils. Expansion of polyethylene was approximately 25 percent.

(b) The procedure of Example VII(a) was repeated with the exception that argon was not employed. The resultant polyethylene evidenced very few cells which were randomly distributed, expansion being approximately 5 percent.

*Example VIII*

(a) The procedure of Example I(a) was repeated with the exception that 10 grams of N,N' dinitrosopentamethylene tetramine were employed. The extruder was preheated to temperatures ranging from 130° C. to 187° C. in the barrel and about 200° C. in the head. Stock temperature was about 197° C. The resultant polyethylene was smooth and evidenced a uniform distribution of fine cells.

(b) The procedure of Example VIII(a) was repeated in the absence of nitrogen. The resultant polyethylene contained very few cells.

*Example IX*

(a) The procedure of Example I(a) was repeated employing 0.2 gram of azodicarbonamide and 1000 grams of polyethylene (Marlex 5065) having a density of 0.95 g./cm.$^3$ at 23° C. and a melt index of 6.5 at 190° C. The resultant polyethylene evidenced a uniform distribution of fine cells and expanded 37.2 percent.

*Example X*

(a) The procedure of Example I(a) was repeated employing 2 grams of azodicarbonamide and 1000 grams of a poly(vinyl chloride) composition having a density of 1.31 g./cm.$^3$ at 23° C., and containing 100 parts of resin 30 parts of di-2-ethylhexylphthalate, 7 parts of dibasic lead phthalate, 0.4 part of wax and 0.4 part of dibasic lead stearate. The resultant extrudate evidenced a uniform distribution of fine cells.

(b) The procedure of Example X(a) was repeated in the absence of nitrogen. The resultant polymer evidenced few cells with little expansion being noted.

(c) The procedure of Example X(a) was repeated in the absence of azodicarbonamide. The resultant composition evidenced a rough surface and few large bubbles with little expansion.

*Example XI*

The procedure of Examples VII(a), VIII(a), IX(a), and X(a) was repeated employing the crosshead covering die shown in FIG. 2, a 19 gauge copper conductor being passed therethrough at a rate of 28, 46, 63 and 57 feet per minute, respectively. In each case, the conductor emerged from the die bearing a smooth continuous covering of expanded polymer having a uniform distribution of fine cells.

*Example XII*

(a) The procedure of Example I(a) was repeated employing argon maintained at a pressure of 1000 p.s.i. and polypropylene having a density of about 0.91 g./cm.$^3$ and a melt index of 2.5 at 230° C. and containing 5 grams of 6,6'-di-tert-butyl-4,4'-o-cresol as an antioxidant. The resultant polypropylene evidenced a uniform distribution of fine cells, expansion being 40.9 percent.

(b) The procedure of Example XII(a) was repeated in the absence of argon. The resultant polypropylene did not contain any cells, expansion being 2.5 percent.

(c) The procedure of Example XII(a) was repeated employing the crosshead covering die shown in FIG. 2, a 19 gauge copper conductor having a diameter of 37.5 mils being passed therethrough at a rate of 63 feet per minute. The conductor emerged from the die bearing a smooth continuous covering of expanded polypropylene having a uniform distribution of fine cells.

*Example XIII*

The procedure described in Example I(a) was repeated over a range of temperatures but 5 grams of carbon black having a particle size of about 400 millimicrons was substituted for azodicarbonamide with (a) 1000 grams of polyethylene having a density of 0.92 g./cm.$^3$, and (b) 1000 grams of polyethylene having a density of 0.95 g./cm.$^3$ (Marlex 5065). In each case four 150-watt projection lamps were used to irradiate the extrudate as it emerged from the die. It was noted that such treatment resulted in production of an expanded polymer having a uniform distribution of fine cells (50–80 bubbles per inch). For comparative purposes the tests were rerun with the lamps off, the bubbles being randomly distributed (5–9 per inch). In the absence of the carbon black, the lamps had no effect on the number or size of bubbles formed.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of the invention, reference being had to the appended claims.

What is claimed is:

1. A method for the preparation of a cellular thermoplastic body which comprises the step of heating a thermoplastic body in admixture with discrete particulate matter in an amount within the range of 0.001 to 0.5 percent by weight of said thermoplastic body to a temperature in excess of the softening point of said thermoplastic body under a pressure within the range of 500–2500 p.s.i. of a gas soluble in the resultant molten thermoplastic material, the said gas essentially saturating said thermoplastic material, and extruding the resultant composition into a zone of lower pressure under conditions such that the molten thermoplastic material is supersaturated with respect to the said gas, the nature of the particulate matter and conditions being such that the temperature of said particulate matter is elevated with respect to the said thermoplastic material in the said zone of lower pressure, whereby gas leaving solution nucleates at the sites of the said particulate matter.

2. A method in accordance with the procedure of claim 1 wherein said cellular thermoplastic body is extruded directly about an electrical conductor.

3. A method in accordance with the procedure of claim 1 wherein said particulate matter is employed in an amount within the range of 0.01 to 0.1 percent by weight of said thermoplastic body.

4. A method in accordance with the procedure of claim 1 wherein said thermoplastic body is polyethylene.

5. A method in accordance with the procedure of claim 1 wherein said thermoplastic body is polypropylene.

6. A method in accordance with the procedure of claim 1 wherein said thermoplastic body is poly(vinyl chloride).

7. A method in accordance with claim 1 wherein said discrete particulate matter is a black body which is irradiated by a source of radiation as it emerges from the extruder.

8. A method in accordance with the procedure of claim 1 wherein said discrete particulate matter is an exothermic chemical reagent which evolves between 100 and 500 calories per gram during decomposition.

9. A method in accordance with the procedure of claim 8 wherein said discrete particulate matter is azodicarbonamide.

10. A method in accordance with the procedure of claim 8 wherein said discrete particulate matter is N-aminophthalimide.

11. A method in accordance with the procedure of claim 8 wherein said discrete particulate matter is 4,4'-oxybis (benzenesulfonylhydrazide).

12. A method in accordance with the procedure of claim 8 wherein said discrete particulate matter is N,N'-dinitrosopentamethylenetetramine.

References Cited by the Examiner

UNITED STATES PATENTS

| 2,299,593 | 10/1942 | Roberts et al. | 260—124 |
|---|---|---|---|
| 2,518,454 | 8/1950 | Elliott | 264—47 XR |
| 2,825,282 | 3/1958 | Gergen et al. | 264—25 XR |
| 2,928,130 | 3/1960 | Gray | 264—50 |
| 3,072,584 | 1/1963 | Karpovich | 264—53 XR |

FOREIGN PATENTS

| 210,728 | 10/1957 | Australia. |
|---|---|---|
| 641,073 | 5/1962 | Canada. |
| 854,586 | 11/1960 | Great Britain. |

OTHER REFERENCES

SPE Journal, "Controlled Density Polystyrene Foam Extrusion," July 1960, pp. 706–709.

ALEXANDER H. BRODMERKEL, *Primary Examiner.*

P. E. ANDERSON, *Assistant Examiner.*